Oct. 26, 1937.  C. H. H. RODANET  2,097,215
TACHYMETER OR SPEED INDICATOR OF THE CHRONOMETRIC
TYPE WITH REMOTE ELECTRIC CONTROL
Filed Dec. 6, 1933
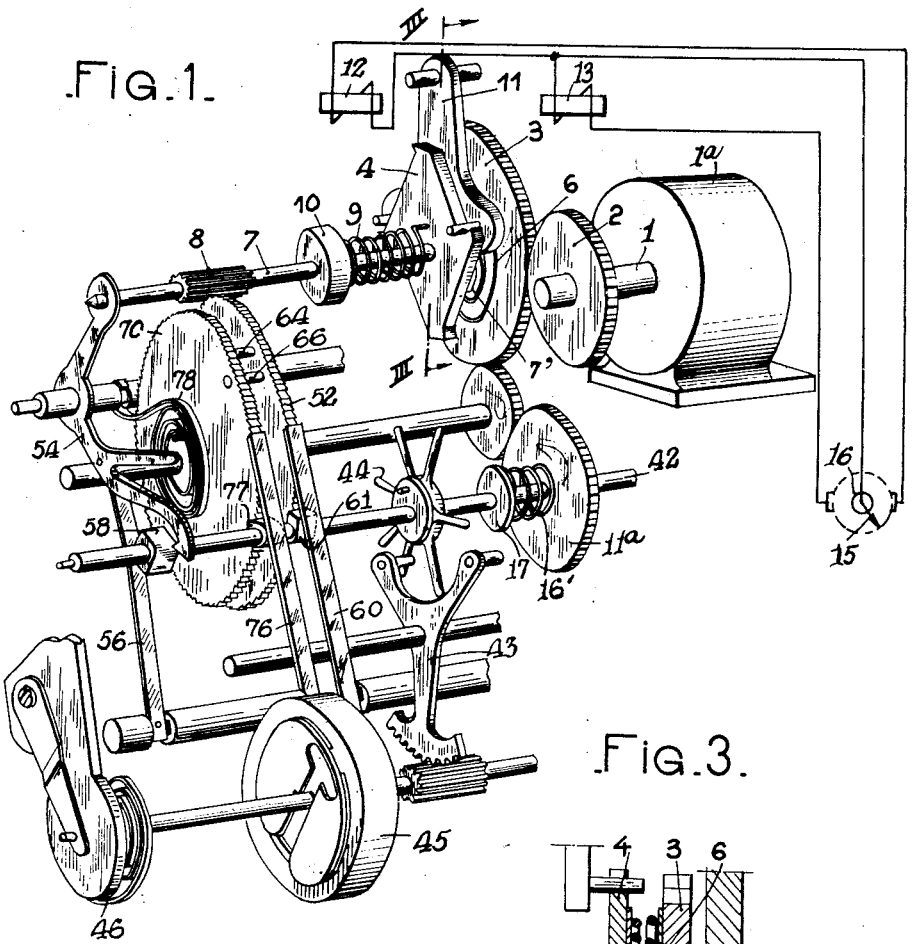
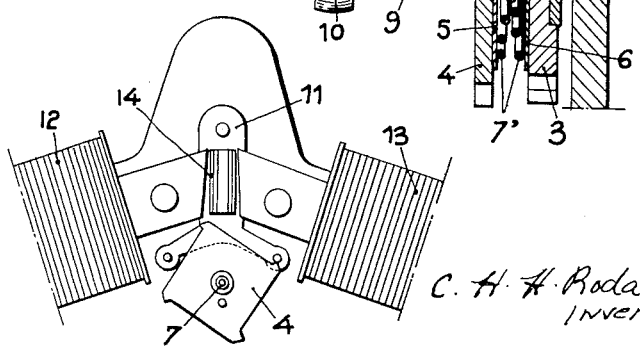
C. H. H. Rodanet
INVENTOR
By: Marks & Clerk
Attys.

UNITED STATES PATENT OFFICE 2,097,215

TACHYMETER OR SPEED INDICATOR OF THE CHRONOMETRIC TYPE WITH REMOTE ELECTRIC CONTROL

Charles Hilaire Henri Rodanet, Neuilly-sur-Seine, France, assignor to Societe Anonyme Etablissements Ed. Jaeger, Levallois-Perret, France Application December 6, 1933, Serial No. 701,246
In France December 14, 1932

5 Claims. (Cl. 235—104)

Tachymeters or speed indicators have been known for a long time, in which a wheel is driven by the shaft the speed of which is to be measured during a definite time, then released for returning to its position of rest under the action of a spring. An index or other indicating device is driven by the movement of the wheel, then retained by a pawl, and finally released, in such a manner that the index indicates, at each cycle, the position reached by the driving wheel.

Previously, use was made of a clockwork, preferably of the automatic winding up type, for controlling the period of time during which the driving wheel was exerting its driving action. Then the applicant has proposed to avoid the use of the spring barrel and of the automatic winding up device by the United States Patent No. 1,626,697 dated May 3, 1927. For that purpose, the shaft provided with cams ensuring the above mentioned functions was driven by the shaft the speed of which was to be measured, by means of a friction coupling, and the speed of the cam shaft was controlled by a chronometric escapement.

The main object of the present invention consists in constructing the apparatus briefly described above in such a manner that it can indicate, without mechanical connection with the shaft, but only by electric control, the number of revolutions per unit of time of said shaft.

In the known apparatus previously indicated, the energy necessary for the actuation of the index on the one hand, and for the operation of the chronometric escapement on the other hand, was borrowed from the shaft the speed of which was to be measured.

According to the present invention, this energy is supplied by an independent motor, for instance an electric motor, the movement of the driving wheel being synchronized with that of the shaft the speed of which is to be measured. In fact, this driving wheel is intermittently actuated, as explained, by a pinion having a movable shaft which must rotate at a speed proportional to that which is to be measured; in practice, it is therefore the speed of rotation of this pinion, called driving pinion, which is, according to the invention, synchronized with the speed to be measured.

The accompanying drawing illustrates, by way of example only, a form of carrying the invention into practice.

Fig. 1 is a diagrammatic perspective view of the device.

Fig. 2 is an end view of the electromagnetic synchronizing device.

Fig. 3 is an axial section made according to line III—III of Fig. 1.

In this arrangement, all the elements of a speed indicator of the chronometric type, according to the United States Patent No. 1,626,697 of the applicant, are maintained, but the shaft 1 which, in the known device, is actuated by the shaft the speed of which is to be measured, is in this case actuated by a motor 1$^a$, for instance an electric motor.

The shaft 1 drives the wheel 3 through the medium of the wheel 2. This wheel 3 is connected, by a friction coupling to the ratchet wheel 4 of an anchor escapement. The friction coupling is more particularly shown in Fig. 3, in which it comprises two friction plates 5 and 6, separated by a spring 7'. The wheel 4 of the escapement is connected to the shaft 7 of the driving pinion 8 by a resilient device, such as a spring 9, a fly wheel 10 being rigidly secured on the shaft 7. One end of the spring 9 is connected with the fly wheel 10.

The anchor 11 is alternately drawn to one side and the other by electromagnets 12 and 13 which are energized by means of a switch 15 rotatively driven by the shaft 16 the speed of which is to be measured. This switch energizes one or more times per revolution, successively, the electromagnets 12 and 13 which attract the armature 14 fitted on the anchor 11. In this manner, the ratchet wheel 4 effects a number of revolutions proportional to the number of revolutions of the shaft the speed of which is to be measured. It will be understood that, in this manner, the entire device operates exactly as if the shaft 1 was directly driven by the shaft 16 the speed of which is to be measured.

The movement of the ratchet wheel 4 is discontinuous. This ratchet wheel 4 is not rigidly secured on the shaft 7, as it is preferable that the shaft 7 should rotate as continuously as possible. For obtaining this result, use is made of the fly wheel 10, the inertia of which regularizes the movement of the shaft 7 which is driven through the medium of the resilient member 9. At the beginning of the actuation of the shaft 7, by the ratchet wheel 4, the spring is tensioned, so that the shaft 7 takes up speed but progressively. Upon stoppage of the ratchet wheel 4, the spring 9 relaxes. It will therefore be seen that, in any case, the spring assists the function of the fly wheel 10. On the contrary, in a friction coupling the friction does not act in the same direction as the fly wheel 10 when the ratchet wheel 4 stops. It is obvious that any means can be provided for deadening the oscillation of the resilient device.

The operation is as follows: When drive shaft 1 is operated by the electric motor 1a, it acts to drive gears 3 and 11a constantly in the same direction. Gear 3 acts through the friction coupling 5—6—7' to operate shaft 7 and pinion 8 thereon, and the anchor escapement 4—11 limits the speed of shaft 7 and pinion 8 at a rate proportional to the speed to be measured. Gear 3 also rotates gear 11a which drives cam shaft 42 through the medium of a slipping clutch, so that shaft 42 may rotate at a speed different from that of gear 11a and, hence, independently of the rate of operation of drive shaft 1 and the shaft 7.

The gear 11a is loosely mounted on the shaft 42, and a spring 16' bears at one end against the adjacent face of the gear 11a. For the sake of clearness, in Fig. 1 an auxiliary plate 17 engaging the spring 16 is shown, but in practice the spring rests directly on the escapement wheel 44.

Cam shaft 42 is controlled by the escapement mechanism 43—46 so that each revolution of the shaft takes place in a predetermined unit of time. In the illustrative embodiment of the invention disclosed herein, the escapement mechanism is arranged to cause a rotation of cam shaft 42 to take place in 14 vibrations of balance wheel 45 which may correspond with a time interval of two seconds, for example. Thus a rotation or single cycle of operation of cam shaft is divided into 14 periods, as the escapement ratchet comprises seven teeth.

During the periods 1 to 7 the spring 56 acts on lever 54 causing engagement of pinion 8 with indexing wheel 52 so that in these seven periods, the wheel 52 is driven, and there is imparted to the latter an angular displacement corresponding to the speed to be measured.

Wheel 52 acts through stud 64 thereon, and the stud 66 carried by setting wheel 70, to effect a corresponding displacement of said wheel 70, which indicates the speed of the shaft 16.

It will be apparent that the operation just described takes place only when the tachymeter starts from its zero position or when the speed to be measured in a particular operating cycle of shaft 42, exceeds that of the previous cycle.

During the sixth period, cam 61 moves from contact with spring detent 60 and the latter engages indexing wheel 52 for holding it in the position to which it is advanced by pinion 8. At or towards the end of the seventh period, cam 58 engages lever 54 operating the latter to rock shaft 7 in its swivel mounting in ratchet wheel 4 so as to disengage pinion 8 from wheel 52. Pinion 8 is maintained disengaged by cam 58 through the eighth to 14th periods, or the remainder of the cycle.

During the seventh period, cam 77 disengages detent 76 from the setting wheel 70 and spring 78 acts to move the latter reversely until the stud 66 thereon contacts the stud 64. Spring 78 may act during whatever portion of the seventh and eighth periods is necessary to engage stud 66 with stud 64. The new position of setting wheel 70 corresponds with that of the indexing wheel 52. The operations here described take place only when the speed of shaft 16 is less than that in the previous cycle.

In the event the shaft 16 has accelerated in a particular measuring cycle so that its speed exceeds that of the previous cycle, the indexing wheel 52 acting through stud 64, and stud 66 on setting wheel 70 will pick up the latter at the time during the first seven periods of the cycle when the instantaneous speed of the engine reaches and exceeds that attained in the previous cycle. Setting wheel 70 will then be carried along with indexing wheel 52 until the angular displacement of the latter in accordance with the higher speed in the cycle terminates at the end of the seventh period thereof, so that it immediately indicates the higher engine speed.

At the end of the eighth period, cam 77 moves from contact with spring detent 76 and the latter reengages setting wheel 70 to hold it in corrected position. Detent 76 retains the setting wheel in its adjusted position during the remainder of the cycle and during part of the following cycle (through periods one to seven) until the detent is again released in the seventh period of the following cycle for enabling readjustment of the wheel as described above.

During the ninth period, cam 61 moves detent 60 from engagement with indexing wheel 52 and, since pinion 8 is disengaged from the latter, a spring not shown acts to return the indexing wheel to its initial position. Said spring may act during whatever part of the ninth to 14th periods if necessary for causing wheel 52, to carry stop arm 64 into engagement with a fixed stud not shown so that the indexing wheel is brought to rest in its starting position. At the beginning of the first period of the next cycle cam 58 releases lever 54 and spring 56 acts thereon to again mesh pinion 8 with indexing wheel 52 so that the latter may be displaced angularly in proportion to the speed of the engine during the measuring periods of the cycle.

When the shaft 16 rotates at a constant speed for an interval of several cycles the indexing wheel 52 is repeatedly advanced in the early or measuring part of each cycle through a corresponding angular displacement until it carries the stud 64 into contact with the stud 66 on setting wheel 70 and is then returned to its initial position during the latter or resetting part of each cycle. Setting wheel 70 having once been adjusted, as described above, to a position corresponding to the constant speed of the shaft 16, remains in that position until said shaft 16 again accelerates or decelerates, whereupon its positions are corrected to correspond with whatever change of speed takes place, as set forth previously.

From the foregoing description it may be seen that the speed of the shaft 16 is repeatedly measured at short intervals by effecting a proportional displacement of the indexing wheel 52 in the early part of each cycle of operation and that the measurement is promptly transferred to the setting wheel 70 for indicating the speed. The duration of the timing interval is preferably sufficiently short that the tachymeter does not lag appreciably in responding to indicate changes in the engine speed but affords a substantially instantaneous and accurate indication of the speed of the shaft 16 at any instant.

What I claim as my invention and desire to secure by Letters Patent is:

1. In combination, a rotating shaft, a tachymeter of the chronometric type for measuring the speed of said rotating shaft, said tachymeter comprising an indexing wheel, a driving pinion, a driving wheel for the driving pinion, a friction coupling for connecting the driving wheel to the driving pinion, means comprising a driving wheel for periodically producing the actuation of the indexing wheel by the driving pinion, a motor arranged for rotating more rapidly than the rotating shaft, means for affording a positive kinematic connection between said motor, the driving wheel of the driving pinion, and the second driving wheel, and means for synchronizing the speed of rotation of the driving pinion, with the speed of rotation of the rotating shaft.

2. In combination, a rotating shaft, a tachymeter of the chronometric type for measuring the speed of said rotating shaft, said tachymeter comprising an indexing wheel, a driving pinion, a driving wheel for the driving pinion, a friction coupling for connecting the driving wheel to the driving pinion, means comprising a driving wheel for periodically producing the actuation of the indexing wheel by the driving pinion, a motor arranged for rotating more rapidly than the rotating shaft, means for affording a positive kinematic connection between said motor, the driving wheel of the driving pinion, and the second driving wheel, a wheel provided with abutments, means for operatively connecting said abutment wheel to the driving pinion, a stop lever cooperating with the abutments of the abutment wheel, means controlled by the rotating shaft for periodically releasing the stop lever from the abutment wheel.

3. In combination, a rotating shaft, a tachymeter of the chronometric type for measuring the speed of said rotating shaft, said tachymeter comprising an indexing wheel, a driving pinion, a driving wheel for the driving pinion, a friction coupling for connecting the driving wheel to the driving pinion, means comprising a driving wheel for periodically producing the actuation of the indexing wheel by the driving pinion, a motor arranged for rotating more rapidly than the rotating shaft, means for affording a positive kinematic connection between said motor, the driving wheel of the driving pinion, and the second driving wheel, an anchor escapement comprising an escapement wheel and an anchor, means for operatively connecting the escapement wheel to the driving pinion, means controlled by the rotating shaft for causing the anchor to periodically rock.

4. In combination, a rotating shaft, a tachymeter of the chronometric type for measuring the speed of said rotating shaft, said tachymeter comprising an indexing wheel, a driving pinion, a driving wheel for the driving pinion, a friction coupling for connecting the driving wheel to the driving pinion, means comprising a driving wheel for periodically producing the actuation of the indexing wheel by the driving pinion, a motor arranged for rotating more rapidly than the rotating shaft, means for affording a positive kinematic connection between said motor, the driving wheel of the driving pinion, and the second driving wheel, an anchor escapement comprising an escapement wheel and an anchor, means for operatively connecting the escapement wheel to the driving pinion, a magnetic armature secured on the anchor, two electromagnets acting in cooperation with said armature, and means controlled by the rotating shaft for alternately energizing each of the electromagnets.

5. In combination, a rotating shaft, a tachymeter of the chronometric type for measuring the speed of said rotating shaft, said tachymeter comprising an indexing wheel, a driving pinion, a driving wheel for the driving pinion, a friction coupling for connecting the driving wheel to the driving pinion, means comprising a driving wheel for periodically producing the actuation of the indexing wheel by the driving pinion, a motor arranged for rotating more rapidly than the rotating shaft, means for affording positive kinematic connection between said motor, the driving wheel of the driving pinion, and the second driving wheel, an anchor escapement comprising an escapement wheel with an anchor, a spring for operatively connecting the escapement wheel to the driving pinion, a magnetic armature secured on the anchor, two electromagnets acting in cooperation with said armature, and means controlled by the rotating shaft for alternately energizing each of the electromagnets.

CHARLES HILAIRE HENRI RODANET.